(12) United States Patent
Edelson (10) Patent No.: US 7,469,858 B2
(45) Date of Patent: Dec. 30, 2008

(54) GEARED WHEEL MOTOR DESIGN

(75) Inventor: Jonathan Sidney Edelson, Sommerville, MA (US)

(73) Assignee: Borealis Technical Limited (GI)

( * ) Notice: Subject to any disclaimer, the term of this patent is extended or adjusted under 35 U.S.C. 154(b) by 443 days.

(21) Appl. No.: 10/574,761

(22) PCT Filed: Oct. 6, 2004

(86) PCT No.: PCT/US2004/033217

§ 371 (c)(1),
(2), (4) Date: Apr. 5, 2006

(87) PCT Pub. No.: WO2005/035358

PCT Pub. Date: Apr. 21, 2005

(65) Prior Publication Data

US 2007/0042854 A1    Feb. 22, 2007

Related U.S. Application Data (60) Provisional application No. 60/510,423, filed on Oct. 9, 2003.

(51) Int. Cl.
*B64C 25/40*    (2006.01)
*F16H 48/06*    (2006.01)

(52) U.S. Cl. .................... 244/103 S; 475/154

(58) Field of Classification Search ........ 475/312, 475/154, 149, 151, 314; 244/103 R, 104 R, 244/50, 63, 103 S
See application file for complete search history.

(56) References Cited

U.S. PATENT DOCUMENTS

| | | | |
|---|---|---|---|
| 2,320,547 A | 6/1943 | Tiger | |
| 2,441,801 A * | 5/1948 | Dever | 310/67 R |
| 2,454,947 A * | 11/1948 | Schroeder | 244/103 S |
| 2,460,387 A | 2/1949 | Hunter | |
| 2,505,770 A * | 5/1950 | Hill | 244/103 S |
| 2,631,476 A | 3/1953 | Ravigneaux | |
| 2,687,857 A | 8/1954 | Caldwell et al. | |
| 3,088,699 A | 5/1963 | Larson | |
| 3,109,324 A | 11/1963 | Locher | |
| 3,608,661 A * | 9/1971 | Arnot | 477/21 |
| 3,711,043 A | 1/1973 | Cameron-Johnson | |
| 3,764,094 A | 10/1973 | Cross | |
| 3,807,664 A | 4/1974 | Kelly, Jr. et al. | |
| 3,850,389 A * | 11/1974 | Dixon | 244/103 S |
| 3,874,618 A | 4/1975 | Bates | |
| 3,977,631 A | 8/1976 | Jenny | |
| 4,659,039 A | 4/1987 | Valdes | |
| 4,930,590 A * | 6/1990 | Love et al. | 180/55 |
| 5,086,994 A | 2/1992 | Donnelly et al. | |

(Continued)

FOREIGN PATENT DOCUMENTS

EP    0756556 B1    9/1999

(Continued)

*Primary Examiner*—Dirk Wright (57) ABSTRACT

The present invention is a compound planetary gear system which has a moveable sun gear and a lockable sun gear to change the gear ratio between a high gear ratio and a pseudo 1:1 slipping ratio. The system makes use of a ratchet and pawl mechanism to provide a safety backup for when the lockable sun gear is locked. The invention may be used to move the aircraft from a stationary position, for taxiing, and for pre-rotating the wheels prior to landing.

21 Claims, 8 Drawing Sheets

U.S. PATENT DOCUMENTS

| | | | |
|---|---|---|---|
| 5,104,063 | A | 4/1992 | Hartley |
| 5,875,994 | A | 3/1999 | McCrory |
| 6,411,890 | B1 | 6/2002 | Zimmerman |
| 6,657,334 | B1 | 12/2003 | Edelson |
| 6,690,295 | B1 | 2/2004 | De Boer |
| 6,838,791 | B2 | 1/2005 | Edelson |
| 6,922,037 | B2 | 7/2005 | Edelson |
| 7,100,722 | B2 * | 9/2006 | Bowen .................. 180/65.5 |
| 2004/0059497 | A1 | 3/2004 | Sankrithi |
| 2005/0253020 | A1 | 11/2005 | McCoskey et al. |
| 2005/0253021 | A1 | 11/2005 | McCoskey et al. |
| 2006/0065779 | A1 | 3/2006 | McCoskey et al. |
| 2007/0158497 | A1 * | 7/2007 | Edelson et al. .......... 244/103 S |

FOREIGN PATENT DOCUMENTS

| | | |
|---|---|---|
| WO | WO-2005/035358 A2 | 4/2005 |
| WO | WO-2006/002207 A2 | 1/2006 |
| WO | WO-2006/065988 A2 | 6/2006 |

\* cited by examiner

Fundamental

Figure 7C

Fifth Harmonic

Figure 7B

Third Harmonic

Figure 7D

Seventh Harmonic

GEARED WHEEL MOTOR DESIGN

CROSS-RERERNCE TO RELATED APPLICATIONS

This application is the U.S. national stage application of International Application PCT/US04/033217, filed Oct. 6, 2004, which international application was published on Apr. 21, 2005, as International Publication WO2005/035358 in the English language. The International Application claims the benefit of application Ser. No. 60/510,423, filed Oct. 9, 2003.

TECHNICAL FIELD

The present invention relates generally to gearing systems for motors, particularly to planetary gearing systems for electric motors. The present invention relates to aircraft landing gears, and more specifically to self-powered ground wheels of aircraft. The present invention also relates to systems for pre-rotating the landing gear wheel prior to landing.

BACKGROUND ART

U.S. Pat. No. 3,711,043 to Cameron-Johnson discloses an aircraft drive wheel having a fluid-pressure-operated motor housed within the wheel and two planetary gear stages housed in a gear box outboard of the motor, the final drive being transmitted from a ring gear of the second gear stage, which is inboard of the first stage, to the wheel through an output drive quill coupled, through a disc-type clutch if desired, to a flanged final drive member bolted to the wheel.

U.S. Pat. No. 3,977,631 to Jenny discloses a wheel drive motor selectively coupled to an aircraft wheel through a rotatably mounted aircraft brake assembly in order to drive the wheels of an aircraft. The normally nonrotating stator portion of a conventional aircraft brake assembly is rotatably mounted about the wheel axle and is rotatably driven through a planetary gear system by the wheel drive motor.

U.S. Pat. No. 5,104,063 to Hartley reviews the prior art on pre-rotation of landing wheels and discloses a device to induce rotation of aircraft landing wheels, using only the force of oncoming air to bring them up to synchronous ground (landing) speed during approach to landing. The wheel has an impeller attached to it, and the wheel is rotated by air from a duct having a forward air intake and an air outlet.

The use of small compact electric motors inside, or in close proximity to, a wheel for direct drive has a number of problems. For example, to move a medium sized aircraft at about 7 knots, approximately 200 hp is required, which equates to approximately 14200 newton-meters of torque and a tractive effort of 41400 newtons, or 9300 pounds.

For such a requirement, torque versus speed characteristics of the load, and the maximum speed characteristics of the load when driven, fall well outside the ideal predicted by motor scaling laws. This means that a motor sized to produce the torque necessary for direct drive of the load will be operating at well below maximum speed, and thus well below maximum power levels. The active materials of the machine will be underutilized, the machine will be far heavier than necessary, and the machine efficiency will be poor.

A solution is to provide for a higher speed, lower torque motor coupled to the load via suitable gearing. This gearing trades speed for torque and provides a lower speed, higher torque drive to the final load. The load however, is expected to operate at much higher than normal motoring speeds. This presents a significant problem, because, in these cases, the load may be rotating faster than the motor and may accelerate the motor via the gearing system. Under these conditions, the motor would be forced to spin at much higher speeds than normal.

DISCLOSURE OF INVENTION

From the foregoing, it may be appreciated that a need has arisen for a small compact gearing system which may be located in or near a drive wheel, and which allows a drive motor to provide the necessary torque with reasonable system mass. Additionally, a mechanism that allows the high gear ratio to automatically de-couple the motor from the load if the load overhauls the motor is required.

The present invention is a planetary gear system with two available gear ratios. The gear system includes two coaxial sun gears, and a compound planetary gear pair, consisting of two planetary gears with differing diameters. The two planetary gears each mesh with a different one of the two sun gears. Change between gear ratios is achieved by locking or unlocking a sun gear. The locking mechanism may be a ratchet which provides for automatic gear reduction in the event of an 'overhauling' load, that is, when the load applies a strong torque through the gear system in the reverse direction. The present invention is a co-axial wheel drive motor using a lockable planetary gear system to provide the necessary torque with reasonable system mass. In the disclosed system, a compound planetary gear system is used to provide a gear ratio necessary to drive the load, while at the same time a ratchet mechanism automatically de-couples the high gear ratio from the load if the load overhauls.

The present invention is a compound planetary gear system having one or more pairs of planetary gears of differing diameters each pair having a common axis and fixedly connected together and rotatable only as a single unit. The planetary gears are fixed to a planetary gear carrier. The system also includes a pair of coaxial sun gears consisting of a lockable sun gear (LSG) and a moveable sun gear (MSG). These also differing diameters, independently rotatable axes, and are coaxial with the planetary gear carrier. The larger planetary gear meshes with the smaller sun gear, and the smaller planetary gear meshes with the larger sun gear. The sum of the radii of the smaller planetary gear and the larger sun gear is equal to the sum of the radii of the larger planetary gear and the smaller sun gear. The two sun gears are interlocked by a magnetic interlock, which causes the sun gears to rotate in synchrony, provided that the differential torque between the sun gears is weaker than the magnetic interlock. The system also includes a locking mechanism which locks LSG to its axis. When LSG is locked to its axis the differential torque between LSG and MSG is greater than the magnetic interlock and MSG rotates at the rotation rate of the planetary gear carrier multiplied by a gear ratio. When LSG is not locked to its axis the differential torque between LSG and MSG is less than the magnetic interlock and the two sun gears rotate at the rotation rate of the planetary gear carrier. A further embodiment of the present invention includes the use of gear rings instead of sun gears. A further embodiment of the present invention includes having more than two sun gear and planetary gear components on each axis.

In the present invention, the enhanced capabilities of a mesh-connected polyphase motor system are additionally harnessed to provide the high levels of torque required when moving from stationary or low speed, and for providing low levels of torque at higher speeds.

This means that the same motor can be used for moving an aircraft around a hangar and for taxiing at an airport, and obviates the need for separate tractor units.

In addition the same motor can be used to pre-rotate the wheels prior to landing to reduce tire wear and for a softer landing, thereby reducing impact stress to undercarriage and other aircraft components.

BRIEF DESCRIPTION OF DRAWINGS

For a more complete explanation of the present invention and the technical advantages thereof, reference is now made to the following description and the accompanying drawings, in which.

BEST MODE FOR CARRYING OUT THE INVENTION

Embodiments of the present invention and their technical advantages may be better understood by referring to FIGS. 1-7.

Figure 1:
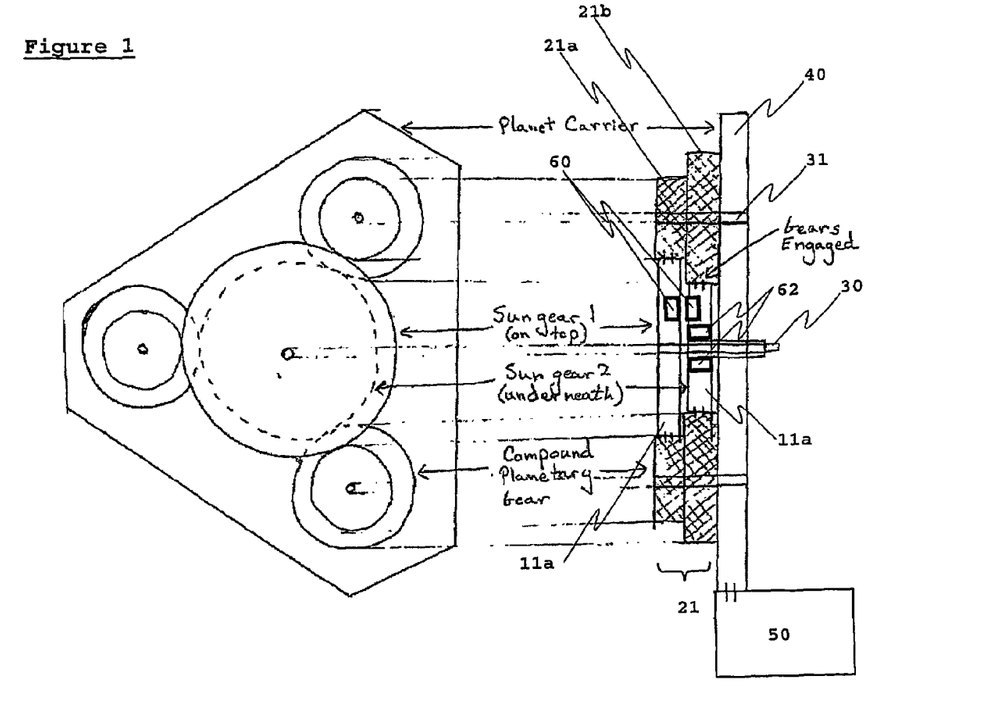
FIG. 1 shows a diagrammatic representation of a front view and a side view of a gear system of the present invention.
Figure 2:
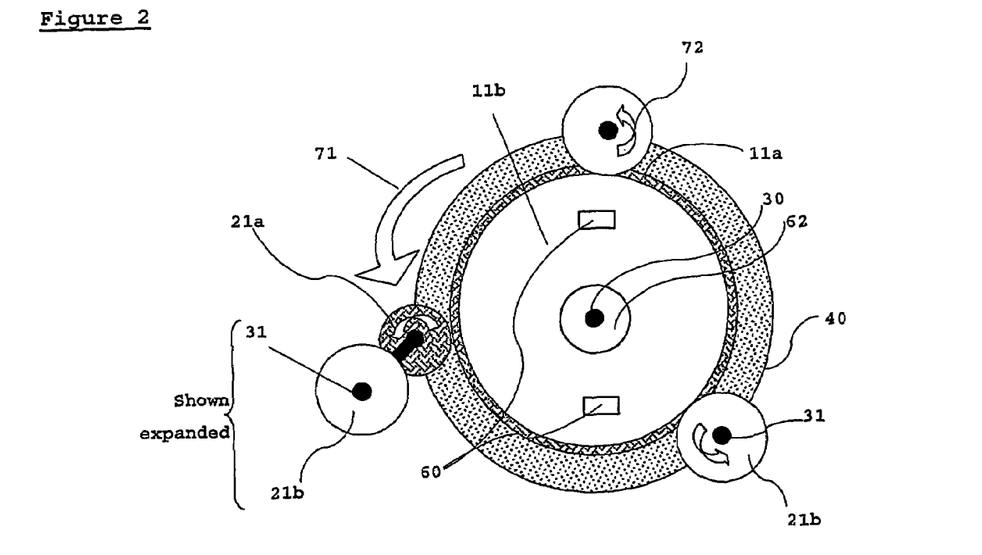
FIG. 2 shows a diagrammatic representation of a front view of a gear system of the present invention.

Referring now to FIGS. 1 and 2, which show diagrammatic representations of a gear system of the present invention useable in a variety of settings, three compound planetary gears 21 all share identical features, and are disposed evenly around a sun gear axis 30. The planetary gears 21 are compound, and consist of two coaxial circular spur gears 21a, and 21b, of different pitch diameter (shown in expanded view in FIG. 2). The coaxial circular spur gears 21a, and 21b are fixedly connected together, or formed initially as a single unit, so that they are only able to rotate as a single unit. The number of compound planetary gears (3 shown here) will be application dependent, with respect to size and torque considerations. For the sake of clarity the gear teeth are not shown. The teeth may be any type of gear teeth known in the art, for example, spur or helical. The planetary gears 21, in operation, are rotated by the planetary carrier 40, around the central sun axis 30, yet they are also free to rotate, each around its own planetary gear axis 31. A motor 50 may be connected to the planetary gear carrier via conventional gearing or directly. A first sun gear, 11a, is disposed on sun gear axis 30, and is connected to a load (not shown). Sun gear 11a is disposed on the same plane as the circular spur gear 21a, and meshes with it. A second sun gear, 11b, of different pitch diameter to the first sun gear 11a, shares sun gear axis 30, although the two sun gears are independent of one another. In a preferred embodiment, sun gear 11b has a slightly smaller pitch diameter than that of sun gear 11a. Sun gear 11b is disposed on the same plane as circular spur gear, 21b, which is disposed to mesh with sun gear 11b. The first and second sun gears 11a and 11b have permanent magnet or electromagnet 60 fixed between them, encouraging the two sun gears 11a and 11b to rotate in synchrony. The number and position of such magnets will depend on the particular application. Furthermore, sun gear 11b has locking system 62 allowing sun gear 11b to be selectively locked to a stationary system part, preferably to its own axis. When the sun gear 11b is selectively locked, the magnet represents a negligible force and does not substantially affect the movement of the other sun gear 11a. In a further embodiment, the second sun gear 11b, is attached to ratcheting or free wheel mechanism 62 of conventional construction, which allows sun gear 11b to be driven by the motor input but not be affected retroactively by the speed of the load.

In operation, planetary gear carrier 40 is driven in the direction of arrow 71 by the motor. Compound planetary gears 21 are fixed in position on planetary carrier 40, however they are free to rotate about their own axes 31. When planetary carrier 40 is rotated by the 50 about sun gear axis 30, planetary gears 21 are forced to rotate around sun gear axis 30, in the direction of arrow 71. Planetary gears 21 are also forced to rotate about their own axes, 31, by rolling without slipping on sun gears 11. The direction in which the planetary gears will rotate about their own axes 31, given the specific pitch diameters above, will be in the direction of arrow 72. Because of the difference in gear ratio between the compound planetary gears and the sun gears, the two sun gears are forced to rotate at different speeds. There are two possible conditions, depending upon the locking state of the lockable sun gear.

The gear system of the present invention has two operating states. In the first operating state, lockable sun gear (LSG) 11b is unlocked. Motor 50 turns compound planetary gear carrier 40, which rotates compound planetary gears 21 about sun axis 30 at motor speed. Compound planet gears 21 are meshed with sun gears 11. Magnetic linkage between the sun gears, provided by magnets 60, causes the sun gears to rotate at the same rate. This linkage also prevents the planetary gears from rotating about their axes 31. This means that the planetary gears are disposed in a fixed position on the sun gears. In this operating state, planet carrier 40, compound planet gears 21, and sun gears 11 all rotate at the same rate. Motor 50 thus drive the load with a 1:1 gear ratio of course the 1:1 gear ratio is not necessarily exact, as load forces may cause the magnetic linkage between sun gears 11a and 11b to slip. However, absent other forces, the gears will tend to rotate according to the path of least resistance, with all gears moving as a single unit.

In the second operating state, lockable sun gear 11b is locked to a stationary shaft. LSG 11b may be locked using a ratcheting system, which permits free rotation in one direction, or it may be locked with a suitable fixed mechanism. Motor 50 drives planet carrier 40. Planet carrier 40 drives planet gears 21 about sun axis 30. Planet gears 21b mesh with LSG 11b. Because LSG 11b is stationary, planet gears 21b are forced to rotate about axis 31 as they roll along LSG 11b. The rotation of planet gears 21b will have the same sense as planet carrier 40. The number of rotations of planet gears 11b per rotation of planet carrier 40 will be set by the ratio of pitch diameter between LSG 11b and planet gears 21b. As compound planet gears 21 rotate, planet gear 21a will roll on moveable sun gear (MSG) 11a. Because the pitch diameters of planet gears 21a and MSG 11a are different from those of planet gears 21b and LSG 11b, MSG 11a will be forced to move relative to LSG 11b. Compound planet gears 21 will transmit torque between LSG 11b and MSG 11a and planet carrier 40.

The gear ratio between the planet carrier input and the MSG 11a output, is dependent on the pitch diameter of the sun and planet gears, and may be determined by the following formula:

$$1/(1-(PPa/PPb)\times(PSb/PSa))$$

in which PSa is the pitch diameter of moveable sun gear 11a, PSb is the pitch diameter of lockable sun gear 11b, PPa is the pitch diameter of the planet gear circular spur component 21a, and PPb is the pitch diameter of the planet gear circular spur component 21b.

Figure 3:
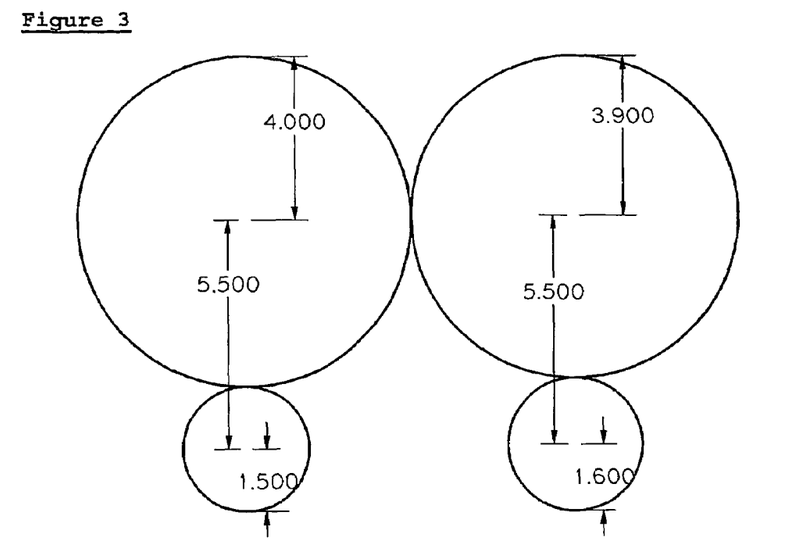
FIG. 3 shows radii of various gears of one embodiment of the present invention.
Figure 4:
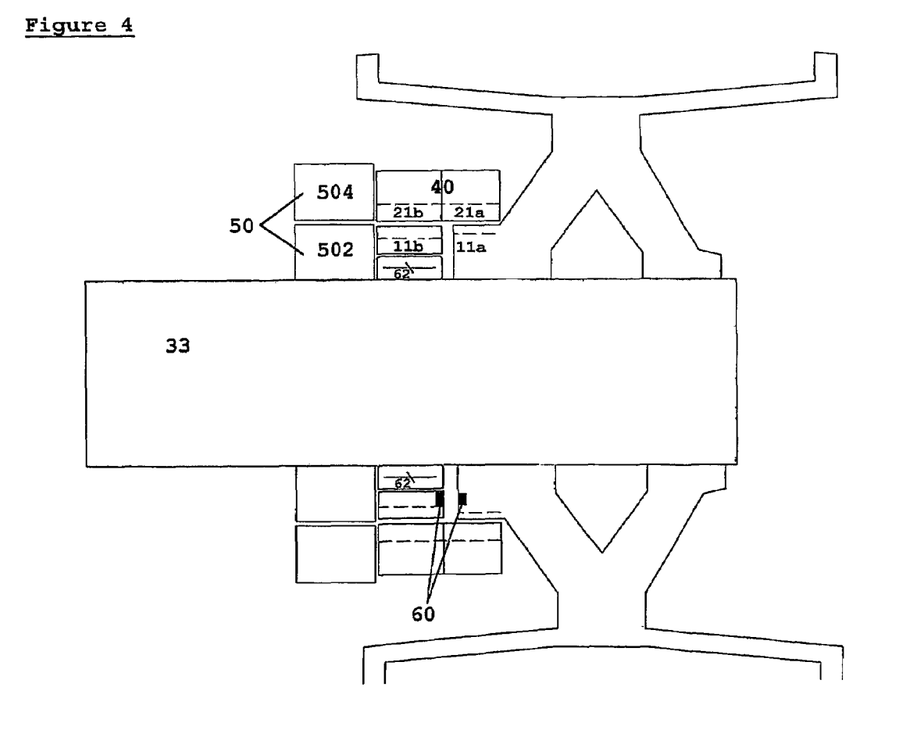
FIG. 4 shows a diagrammatic representation of a cross-section of a drive system of the present invention used in the hub of an aircraft nose wheel.

The pitch diameter of the planetary gear components gears 21a and 21b and the distance of the planetary gear axis 31 from the sun gear axis 30 are calculated to enable proper meshing between each sun gear and its co-planar component circular spur gears of planetary gears 21. Sample comparative measurements are shown in FIG. 3. Here PPb=1.6; PPa=1.5; PSb=3.9; PSa=4.0, and therefore the gear ratio is:

$$1/(1-(1.5/1.6)\times(3.9/4.0))=11.64$$

To further define and disclose the present invention, an embodiment with specific gear pitch diameters and tooth counts is provided. The specific number of teeth should be seen as exemplary and not as limiting the scope of the invention. The actual number of teeth, number of compound planetary gears, etc. will be determined by the specific application. In general, the sun gears 11a and 11b will be considerably larger than planetary gears 21. For example, moving sun gear 11a may have 61 teeth. Lockable sun gear 11b has 60 teeth. Compound planetary gear 21 is composed of component 21a with 20 teeth, and component 21b with 21 teeth. Sun gears 11a and 11b are selected to have slightly different tooth counts, and thus slightly different pitch diameters. Compound planetary gear components 21a and 21b are selected to properly mesh with sun gears 11a and 11b.

If the locked sun gear 11b has 60 teeth, and planet gear 21b has 20 teeth, when the planet carrier rotates once, the compound planet gears have moved all the way around the sun gear once, and must have rotated 3 times, because of the gear ratio between 11b and 21b. For a moveable sun gear 11a having 61 teeth, then its diameter has increased by 1 tooth pitch divided by π, and thus planet gear 21a must have 19 teeth, since its diameter will need to decrease by 1 tooth pitch divided by π to keep the axis positions the same. Since the planet gears are compound gears, then both halves of the planet gears will turn at the same time. Thus when the planet carrier makes one revolution about the fixed sun gear, the planet gears will make 3 revolutions. Now, the 19 teeth of 21a making 3 revolutions around the 61 teeth of 11a means that the second half of the planet gears will have rolled only 57/61 of the way around the second (moveable) sun gear. Since the planet gears have moved all the way around the fixed sun gear, and 57/61 of the way around the second sun gear, the two sun gears must move relative to each other. For each input revolution of the planet carrier, the second sun gear will move 4/61 of a revolution, for a gear ratio of approximately 15:1.

This non-slipping, high gear ratio means that input speed is reduced at the output, and input torque is increased at the output. This permits motor 50 to drive the load with high torque although at low speed. The increased output torque is provided by the reaction torque on the locking mechanism of LSG 11b To further illustrate the application of the present invention, reference is made to FIG. 4, which shows the gearing system of the invention arranged to drive the nose wheel of an aircraft. Electric motor 50 is supported on strut 34 of an aircraft nose wheel. The motor comprises a stator 502 and a rotor 504, and in the embodiment shown in FIG. 4, the motor is an inside-out motor having the stator attached to the strut, and having the rotor attached to gear system 506. The gear system comprises a planetary gear carrier 40, compound planetary gears 21a and 21b, and sun gears 11a and 11b. The motor drives the planetary gear carrier, and sun gear 11a rotates around the strut and drives the wheel. Sun gear 11a is referred to in the following as the Moveable Sun Gear (MSG). In this preferred embodiment, the motor and gears are located within a nose wheel of an aircraft. A locking mechanism 62 is provided for locking sun gear 11b to the strut, thereby preventing sun gear 11b from rotating during low speed, high torque operation. Sun gear 11b is referred to in the following as the Lockable Sun Gear (LSG). During low torque, high speed, direct drive operation, the locking mechanism is disengaged and magnets 60 on the two sun gears cause the two sun gears to rotate together at substantially the same speed as the motor drive, thereby providing direct drive from the motor to the wheel.

Figure 5:
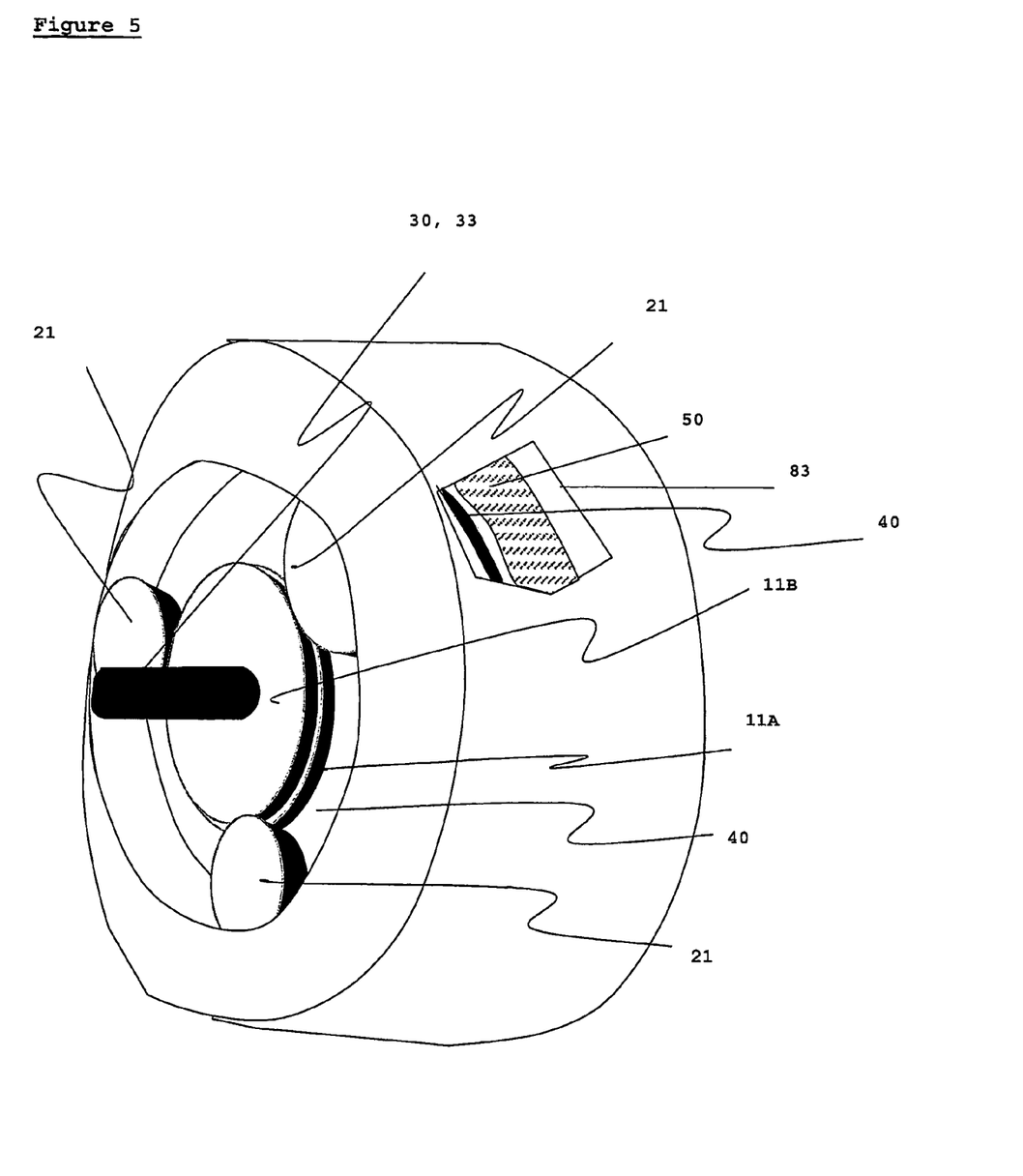
FIG. 5 shows a three dimensional view of one embodiment of the present invention used in an aircraft nose gear.

Referring now to FIG. 5, which shows a three dimensional view of one embodiment of the present invention used within a nose wheel of an aircraft, motor 50 is located behind planetary carrier 40 (shown in cutout section 83). Whilst this is a preferred location for the motor, it is to be understood that the illustrated motor/planetary carrier position is not intended to limit the scope of the invention, and the motor may be alternatively situated elsewhere. For example, the motor may be located within the fuselage of the aircraft, and drive may be provided to the planetary carrier via a gear train or belt system. Planetary carrier 40 is driven by the motor and rotates compound planetary gears 21, around sun gear axis 30. The number of planetary gears (3 shown here) will be application dependent, with respect to size and torque considerations. The compound planetary gears are shown in this embodiment to have a slanting toothed surface enabling proper meshing with the sun gears 11a and 11b. For the sake of clarity the gear teeth are not shown. The teeth may be any type of gear teeth known in the art, for example, spur or helical. Planetary gear component 21a rotate sun gear 11a; sun gear 11a directly drives the wheel. The sun gear axis 30 may be centered on axle 33 of the nose wheel.

As disclosed above, motor 50 itself may be an 'inside-out' radial flux induction motor 50. The stator may be on the inside of the motor, mounted to the same hollow shaft which usually supports the conventional (non-driven) wheels. All of the necessary electrical conductors will be fed through the hollow shaft, and will not interfere with the various system bearings involved. Viewed externally, the stator will look much like a conventional wound rotor build using conventional lamination materials and copper conductors. Rectangular conductors and formed coils may be used, rather than random wound coils. This provides for better cooling of the copper conductors, greater stability to vibration and G forces, as well as better slot fill and more efficient use of the magnetic iron. The rotor may be mounted on end bells and bearings, again on the same hollow shaft. Planet gear carrier 40 may be directly coupled to the rotor.

In an exemplary embodiment, the outer diameter of the rotor is approximately 10-15 inches, and the total length of the motor 50 including end bells is between 7 and 9 inches. The gearing system occupies the space within a wheel hub half. The 'foot' of one half of the wheel hub (that portion of the wheel hub at the center which is supported by the bearing, which in profile appears as a foot) may be used as the mobile sun gear described above. In order to carry the necessary tooth forces, the width of the foot may need to be increased. The stationary sun gear described above is roughly the same size as the hub foot, and is mounted on a bearing adjacent to the hub foot. The radial forces on the stationary sun gear are much lower than those on the hub, and space for this bearing is shared with the pawl mechanism. The motor is then adjacent to the stationary sun gear, and the planet gear carrier is mounted on the motor 50 such that the planet gears are held in proper radial contact with the sun gears. Using a pitch diameter of 8" for the rotating sun gear, 7.8" for the stationary sun gear, 3" for the rotating side planet gear and 3.2" for the stationary side planet gear, an overall system diameter <15" may be maintained, with a gear ratio of about 11.5:1.

During high speed operation where the driven wheel may act to 'back drive' motor 50, torques on the gear system are reversed. In the ideal case, the pawl system is retracted, and the motor 50 simply spins at the same speed as the wheel. In the event that the speed of the system is too high, the pawl mechanism used to hold the stationary sun gear in place is designed to ratchet, acting in a failsafe manner to protect the motor 50 from over-speed operation.

The ratchet mechanism locks LSG 11*b* only when torque applied to LSG 11*b* is in the proper direction for motor 50 to drive the load forward. In contrast, should the load attempt to drive motor 50, which might result in a dangerous overspeed condition, the torque applied to LSG 11*b* will reverse, and the ratchet mechanism will release. In this case, the gear ratio will revert to the slipping 1:1 gear ratio.

It is desirable to use the 1:1 gear ratio when the load is moving rapidly. In the case of aircraft wheels, the slipping 1:1 gear ratio might be used to 'prespin' wheels prior to landing. In addition, the non-slipping high gear ratio presents a danger. In the event of a forceful overhauling load, say for example the inertial forces on an aircraft wheel at touchdown, the 1:1 gear ratio is desirable to protect motor 50 from over-speed. It is desirable in this case for an automatic transition between the high gear ratio and the slipping 1:1 gear ratio.

A further embodiment of the invention is a system for prerotating an aircraft's landing gear wheel prior to landing. The aircraft has at least one landing gear wheel attached to the aircraft by a support. The system has conventional sensors for measuring the true ground speed of the aircraft independently from the aircraft's airspeed. It also has the compound planetary gear system as described above and a motor which rotates the wheel at a selected speed while the aircraft is airborne. This is controlled by a system that measures the rotational speeds of the wheel, and is responsive to the true ground speed and to the speed of the wheel. This ensures that the rotational speed of the wheel correspond to the true ground speed of the aircraft. For this embodiment the said locking mechanism is not selected and the compound planetary gear system provides a slippy 1:1 ratio.

Figure 6A:
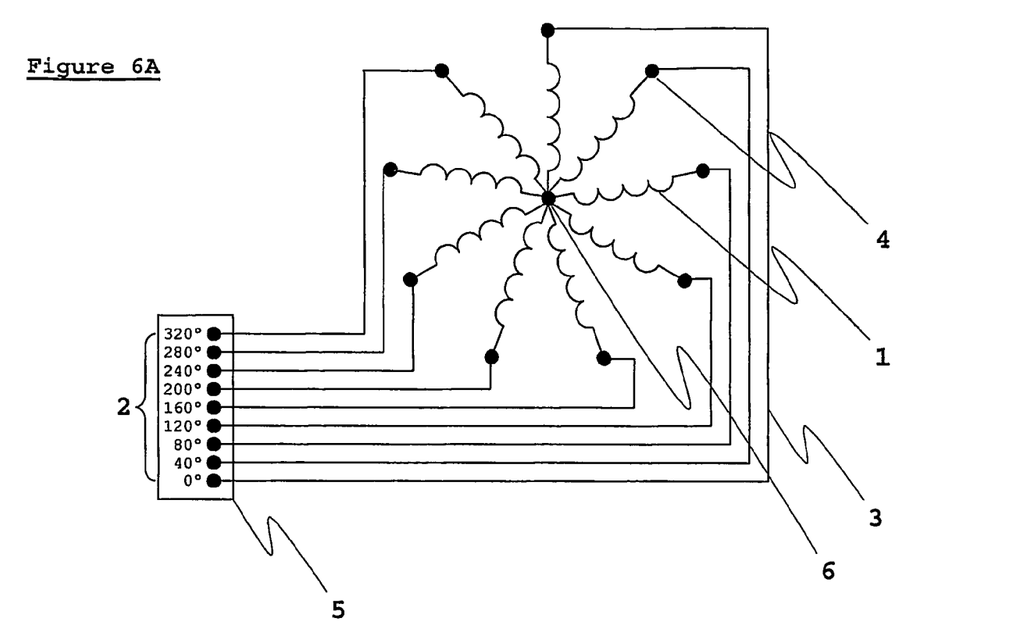
FIGS. 6A-E illustrate a plurality of ways in which the polyphase inverter may be connected to a polyphase motor.
Figure 6B:
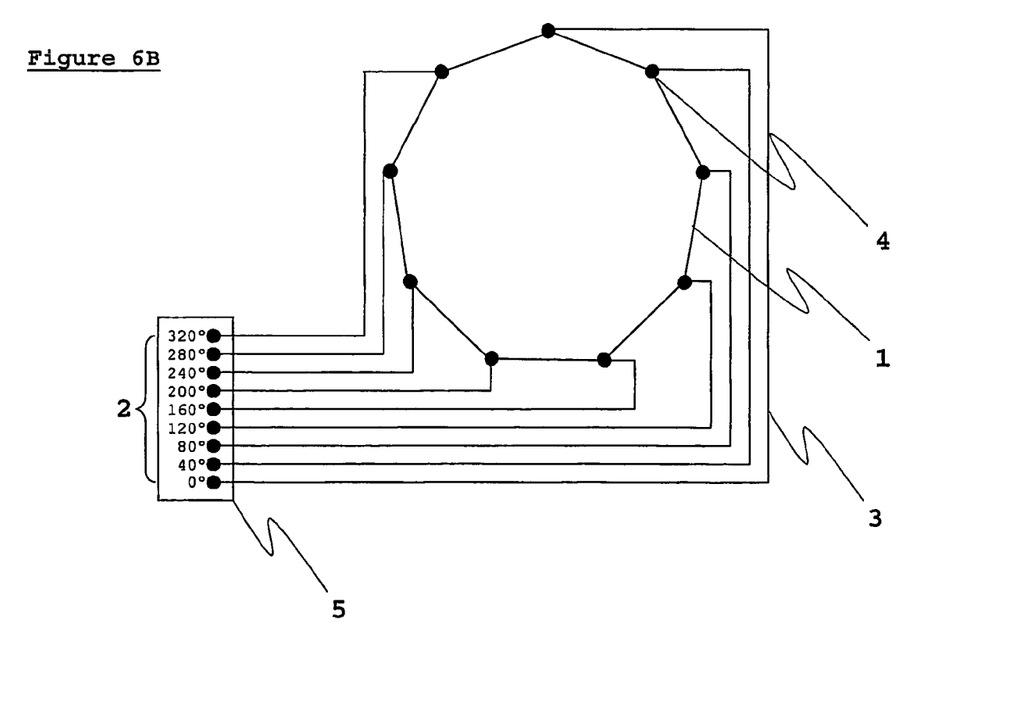
Figure 6C:
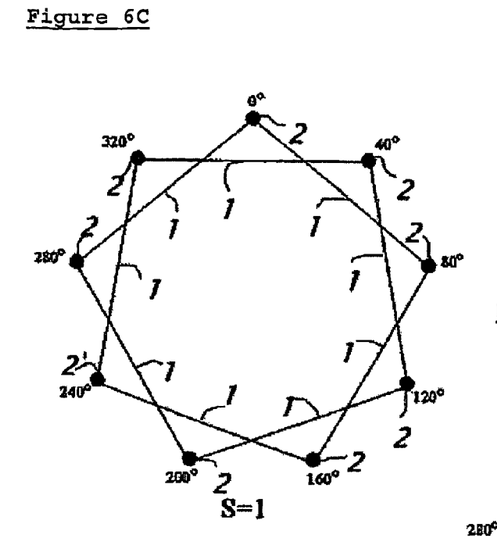
Figure 6D:
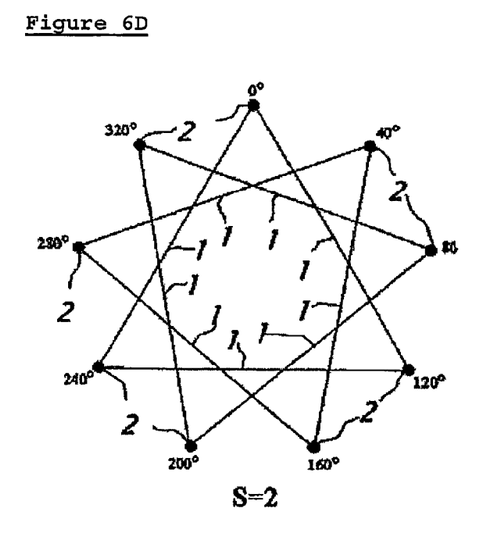
Figure 6E:
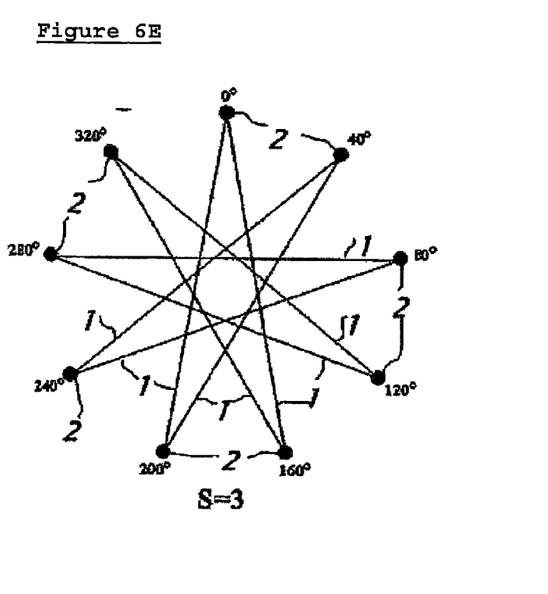
Figure 7A:
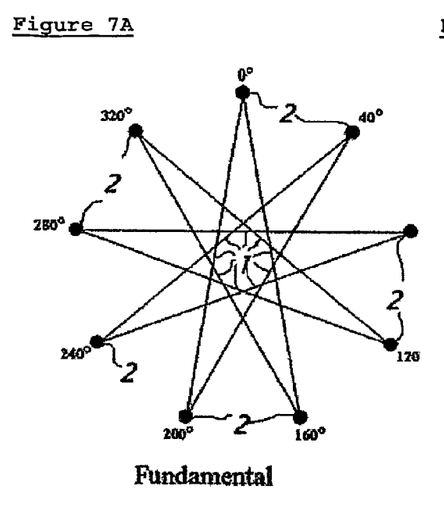
FIGS. 7A-D illustrate how winding terminals of a motor connected to a polyphase inverter in a particular fashion may be driven by the inverter with various phase angles.
Figure 7B:
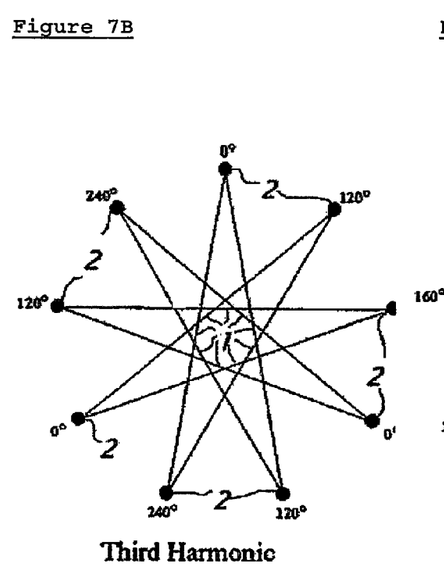
Figure 7C:
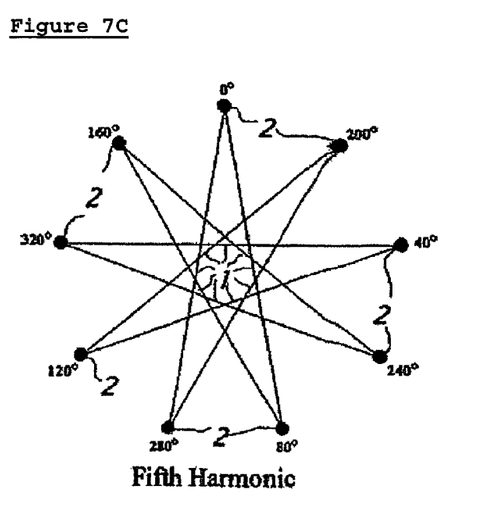
Figure 7D:
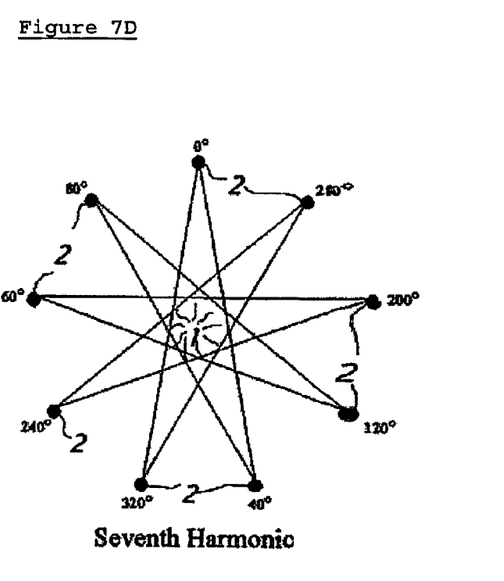

Motor 50 may be any suitable motor, including an electric motor or an hydraulic motor. Preferably, the motor is an electric motor, and in a preferred embodiment, it is a high-phase order mesh-connected motor of the kind described in U.S. Pat. No. 6,657,334. Referring now to FIG. 6*a*, which shows a simple graphical schematic of the permissible inverter to motor windings connections for a polyphase motor having 9 phases, 9 evenly spaced terminals 4 and a center terminal 6 are shown. Each of the terminals 4 represent one end of a motor winding 1 and the center terminal 6 represents the other end of the motor winding. An inverter 5 has 9 terminals 2, which are connected to one of the terminals 4 of each of the motor windings 1 via electrical connectors 3 as shown. In this embodiment, the number of phases, N is equal to 9, but it is to be understood that this limitation is made to better illustrate the invention; other values for N are also considered to be within the scope of the present invention.

Permissible connections of the 9 phase windings are either from the center point, to each of the 9 points on the circle (this being the star connection shown as FIG. 6*a*) or from each of the 9 points to another point S skipped points distant in the clockwise direction, where S represents the number of skipped points (inverter terminals). This latter is shown in FIGS. 6*b-e*; in FIG. 6*b* motor winding 1 is represented by a line, and in FIGS. 6*c-e* inverter 5 and electrical connectors 3 have been omitted for the sake of clarity. It will be noted that for each S from 0 to 3 there is a corresponding S from 4 to 7 that produces a mirror image connection.

FIG. 6 shows all permissible connections for a 9 phase system from S=0 to S=3 as well as the star connection. Noted on the star connection diagram (FIG. 6*a*) are the relative phase angles of the inverter phases driving each terminal. For a given inverter output voltage, measured between an output terminal 2 and the neutral point, 6 each of these possible connections will place a different voltage on the connected windings. For the star connection, the voltage across the connected windings is exactly equal to the inverter output voltage. However, for each of the other connections (FIGS. 2*b-e*), the voltage across a winding is given by the vector difference in voltage of the two inverter output terminals 2 to which the winding 1 is connected. When this phase difference is large, then the voltage across the winding will be large, and when this phase difference is small, then the voltage across the winding will be small. It should be noted that the inverter output voltage stays exactly the same in all these cases, just that the voltage difference across a given winding will change with different connection spans. The equation for the voltage across a winding is given by:

$$2\sin\left(\frac{\Delta}{2}\right)V_{out}$$

where $\Delta$ is the phase angle difference of the inverter output terminals driving the winding, and $V_{out}$ is the output to neutral voltage of the inverter.

Thus, referring to FIG. 6, when S=0 (FIG. 6*b*), the phase angle difference is 40 degrees, and the voltage across a winding is 0.684Vout. When S=1 (FIG. 6*c*), the phase angle difference is 80 degrees, and the voltage across the winding is 1.29Vout. When S=2 (FIG. 6*d*), the phase angle difference is 120 degrees, and the voltage across the winding is 1.73Vout. Finally, when S=3 (FIG. 6*e*), the phase angle difference is 160 degrees, and the voltage across the winding is 1.97Vout. For the same inverter output voltage, different connections place different voltage across the windings, and will cause different currents to flow in the windings. The different mesh connections cause the motor to present a different impedance to the inverter. In other words, the different mesh connections allow the motor to use the power supplied by the inverter in different ratios of voltage and current, some ratios being beneficial to maximize the torque output (at the expense of available speed), and some ratios to maximize the speed output (at the expense of maximum available torque).

To deliver the same power to the motor, the same voltage would have to be placed across the windings, and the same current would flow through the windings. However, for the S=0 connection, to place the same voltage across the windings, the inverter output voltage would need to be much greater than with the S=3 connection. If the inverter is operating with a higher output voltage, then to deliver the same output power it will also operate at a lower output current. This means that the S=0 connection is a relatively higher voltage and lower current connection, whereas the S=3 connection is a relatively lower voltage, higher current connection.

The S=0 connection is desirable for low speed operation, where it increases the overload capabilities of the drive, and permits much higher current to flow in the motor windings than flow out of the inverter terminals. The S=3 connection is desirable for high speed operation, and permits a much higher voltage to be placed across the windings than the inverter phase to neutral voltage. This change in connection is quite analogous to the change between star and delta connection for a three-phase machine, and may be accomplished with a mechanical switching arrangement, such as that disclosed in U.S. Pat. No. 6,838,791.

There is, however, an additional approach available with high phase order inverter driven systems.

The inverter, in addition to being an arbitrary voltage and current source, is also a source of arbitrary phase AC power, and this output phase is electronically adjustable. Any periodic waveform, including an alternating current may be described in terms of amplitude, frequency, and phase; phase is a measure of the displacement in time of a waveform. In a polyphase inverter system, phase is measured as a relative phase displacement between the various outputs, and between any pair of inverter terminals, an electrical phase angle may be determined. In the case of conventional three phase systems, this electrical phase angle is fixed at 120 degrees. However in polyphase systems this phase angle is not fixed. Thus, while the machine terminals 1 . . . 9 may be fixed in their connection to inverter terminals 1 . . . 9, the phase relation of the inverter terminals connected to any given motor winding terminals is not fixed. By changing the inverter phase relation, the impedance that the motor presents to the inverter may be changed. This may be done without contactors.

With Reference to FIG. 7, a 9 phase machine is connected to the inverter system using the S=3 mesh. One terminal of each of two windings 1 is connected to each inverter terminal 2. When driven with 'first order' phase differences, then the results are as described above for the S=3 mesh. However, if the phase angles are adjusted by multiplying each absolute phase reference by a factor of three, then the phase differences placed across each winding become the same as those found in the S=2 case, although the topological connectivity is different. If the phase angles are adjusted by a multiplicative factor of five, then the voltages across windings become like those of the S=1 case, and with a multiplicative factor of seven, the voltages become like those of the S=0 case. A multiplicative factor of nine causes all phases to have the same phase angle, and places no voltage difference across the winding.

These changes in phase angle are precisely the changes in phase angle used to change the operating pole count of a high phase order induction machine, as described in others of my patent applications and issued patents.

If a high phase count concentrated winding induction machine is operated by an inverter, but is connected using a mesh connection, then changes in pole count of the machine will be associated with changes in machine effective connectivity. These changes in effective connectivity permit high current overload operation at low speed, while maintaining high-speed capability, without the need for contactors or actual machine connection changes.

Of particular value are machines connected such that the fundamental, or lowest pole count, operation is associated with a relative phase angle across any given winding of nearly, but not exactly, 120 degrees. In these cases, altering the output of the inverter by changing the absolute phase angles by a multiplicative factor of three, which may also be described as operation with the third harmonic will result in the relative phase angle across any given winding becoming very small, and causing large winding currents to flow with low inverter currents. A particular example would be a 34 slot, 17 phase machine, wound with full span, concentrated windings, to produce a two pole rotating field. The winding terminations are connected to the inverter using the S=5 mesh. The relative phase angle of the inverter outputs placed across any given winding would be 127 degrees, and the voltage placed across this winding relative to the inverter output voltage is 1.79 times the inverter output voltage. If the machine is then operated with a third harmonic waveform, it will operate as a six pole machine. The relative phase angle across any given winding is now 127*3mod 360=21 degrees, and the voltage placed across the winding relative to the inverter output voltage is 0.37 times the inverter output voltage. Simply by changing the inverter drive angles, the Volts/Hertz relationship of the motor is increased, and inverter limited overload capability is enhanced.

The 'switching' between modes of operation in this mesh-connected motor/inverter combination are achieved by altering the harmonic content of the output from the inverter, effectively changing the volts/hertz relation of the motor, thereby producing a variable impedance motor.

While this invention has been described with reference to numerous embodiments, it is to be understood that this description is not intended to be construed in a limiting sense. Various modifications and combinations of the illustrative embodiments will be apparent to persons skilled in the art upon reference to this description. It is to be further understood, therefore, that numerous changes in the details of the embodiments of the present invention and additional embodiments of the present invention will be apparent to, and may be made by, persons of ordinary skill in the art having reference to this description. It is contemplated that all such changes and additional embodiments are within the spirit and true scope of the invention as claimed below.

For example, in another embodiment, a reverse gear is optionally available between the MSG 11a output and the load. The effect of this gear, when in operation is to reverse the direction of the load rotation, relative to the direction of the planet carrier 40 rotation. With the ratchet system described, changing the direction of motor 50 rotation, or of planet carrier rotation, will only be effective in allowing the load to turn in reverse with a 1:1 gear ratio. However, a reverse gear (which may be simple or complex, as is well known in the art), when used between the MSG and the load, will act to change the direction of load rotation, in a way that the ratchet system will allow operation with a high torque, low speed gear ratio.

Figure 8:
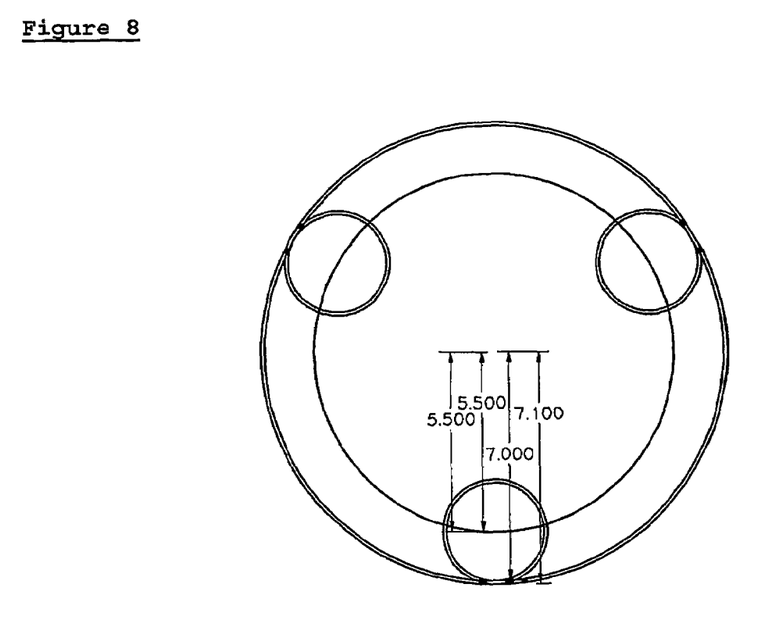
FIG. 8 shows a diagrammatic representation of a plan view of a gear system of the present invention employing ring gears in place of sun gears.

In a further embodiment, shown in FIG. 8, the sun gears are replaced by ring gears 41a and 41b, whilst planet gear components 21a and 21b are rotated by planet carrier 40 within ring gears 41a and 41b. The invention works in the same manner as described with relation to sun gears 11a and 11b, and a ratchet and/or a locking mechanism may act on the ring gears from an external surface of the lockable ring gear 41b, or against a side of lockable ring gear 41b.

Figure 9A:
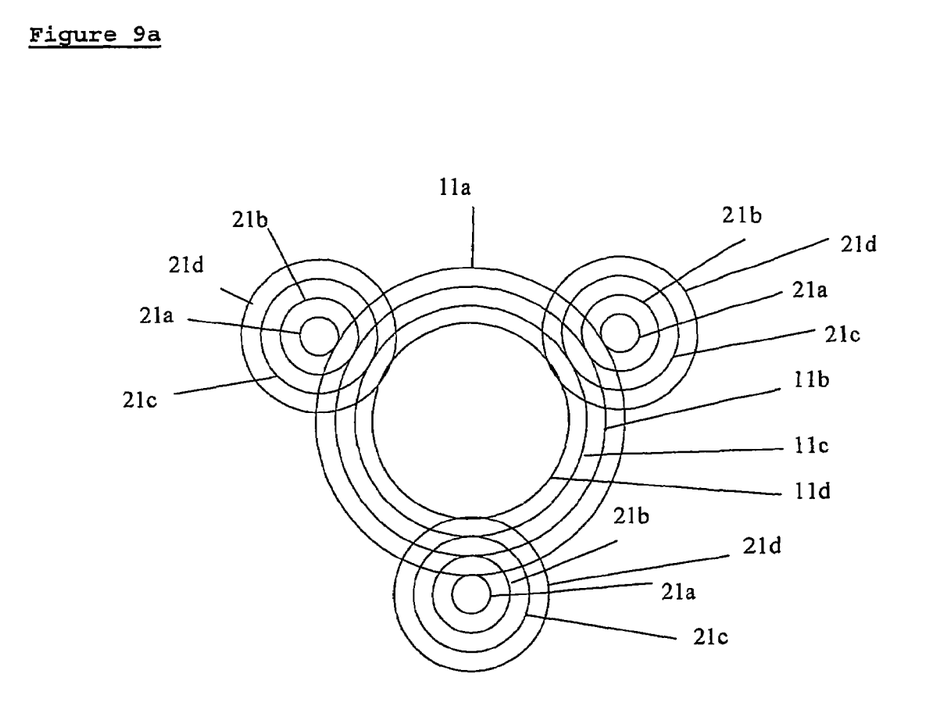
FIGS. 9a-9c show diagrammatic representations of a gear system of the present invention employing multiple gears.
Figure 9B:
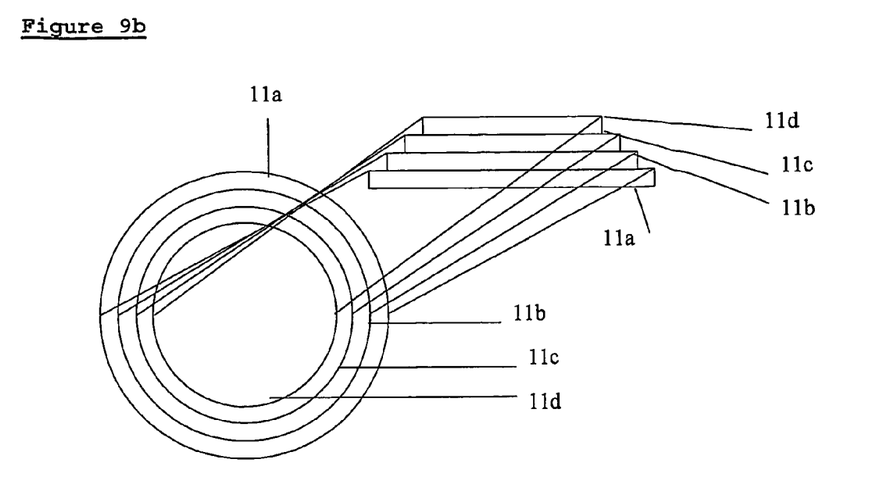
Figure 9C:
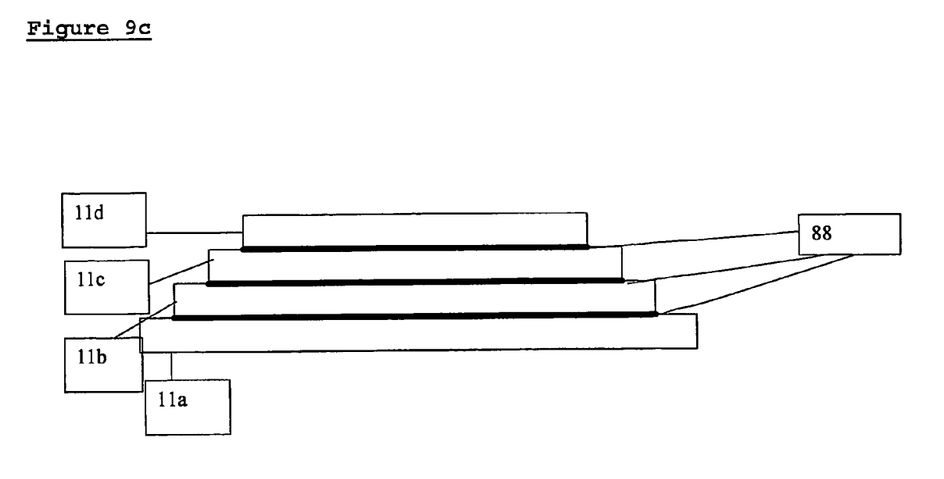

The invention is not limited to two different gear ratios. The compound gear 21 may be composed of additional spur components, 21c, 21d etc. There would also be additional lockable sun gears, 11c, 11d etc., meshing with the additional planet gear spur components, as shown in FIG. 9a. FIG. 9b shows a plan view and a side view of the pile of sun gears 11a-11d. Each additional lockable sun gear would be separately lockable and have an attached magnet 60 to attach it directly or indirectly to moveable sun gear 11a so that when lockable sun gears 11c, and/or 11d are released, they can still only rotate more or less in lockstep with moveable sun gear 11a. In one embodiment, moveable sun gear 11a has the greatest pitch diameter of the sun gears, whilst LSG 11b has the next largest, etc. The sun gears are mounted in alphabetical order, beginning with MSG 11a, and then LSGs 11b, 11c and 11d (if used). A separate magnet 60 is placed between each sun gear and the adjoining sun gear, as shown in FIG. 9c. By selectively locking one or more of the lockable sun gears 11a, 11b and 11c, one can vary between three different gear ratios.

It is further possible to replace the ratchet mechanism with a different ratchet mechanism acting between the moveable sun gear and the load. This ratchet may be identical to, or a variation of, the ratchet often used between the pedals and the back wheel of many bicycles, and will allow the motor to rotate the load whilst preventing the torque from the load from having an effect on motor.

In a further embodiment, the stationary sun gear is held stationary throughout operation, no ratchet system is employed, and only the second operating state is used.

The present invention is described using spur components, however this is for simplicity's sake, and helical components would be an equally suitable alternative.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

INDUSTRIAL APPLICABILITY

The present invention may be applied in any application where a small compact and co-axial gearing system is required, specifically to provide direct drive at high speed, or a reduced speed drive having higher torque.

The invention claimed is:

1. A compound planetary gear system, comprising:
   a. one or more pairs of planetary gears of differing diameters each pair having a common axis and fixedly connected together and rotatable only as a single unit, said common axis attached to:
   b. a planetary gear carrier;
   c. a pair of coaxial sun gears consisting of a lockable sun gear (LSG) and a moveable sun gear (MSG), wherein said sun gears have differing diameters, independent axes, and are coaxial with said planetary gear carrier; and wherein a larger planetary gear meshes with a smaller sun gear, a smaller planetary gear meshes with a larger sun gear, and the sum of the radii of the smaller planetary gear and the larger sun gear is equal to the sum of the radii of the larger planetary gear and the smaller sun gear, and wherein said sun gears are interlocked by:
   d. a magnetic interlock, which causes said sun gears to rotate in synchrony, provided that a differential torque between said sun gears is weaker than said magnetic interlock;
   e. a locking mechanism which locks LSG to its axis, wherein when LSG is locked to its axis said differential torque between LSG and MSG is greater than said magnetic interlock and MSG rotates at the rotation rate of said planetary gear carrier multiplied by a gear ratio; and wherein when LSG is not locked to its axis said differential torque between LSG and MSG is less than said magnetic interlock and the two sun gears rotate at the rotation rate of said planetary gear carrier.

2. The compound planetary gear system of claim 1 wherein said gear ratio is $1/(1-(PPa/PPb)\times(PSb/PSa))$, wherein PSa is a pitch diameter of said MSG, PSb is the pitch diameter said LSG, PPa is the pitch diameter of a planet gear that meshes with said MSG, and PPb is the pitch diameter of a planet gear that meshes with said LSG.

3. The compound planetary gear system of claim 1 additionally comprising:
   g. an input means connected to said planetary gear carrier; and
   h. an output means connected to said MSG.

4. The compound planetary gear system of claim 3 wherein said input means is connected to a motor.

5. The compound planetary gear system of claim 4 wherein said motor is selected from the group consisting of electric motor, radial flux induction motor, and hydraulic motor.

6. The compound planetary gear system of claim 5 wherein said electric motor is a high phase order induction machine drive system, comprising:
   a) an inverter system for the synthesis of a plurality of phases of alternating current output, each phase electrically connected to at least one inverter terminal, and
   b) an induction motor comprising N phases, where N is greater than 3, connected mesh to said inverter terminals, said mesh characterized in that:
   each motor phase is electrically connected to:
   (i) a first inverter terminal, and
   (ii) a second inverter terminal S skipped terminals distant from said first inverter terminal in order of electrical phase angle, where S is the skip number and represents the number of skipped terminals;
   and the phase angle difference between the two inverter terminals to which each motor phase is connected is identical for each motor phase.

7. The compound planetary gear system of claim 3 wherein said input means is connected to a load.

8. The compound planetary gear system of claim 7 wherein said load is an aircraft wheel.

9. The compound planetary gear system of claim 1 wherein said locking mechanism additionally comprises a ratcheting mechanism.

10. The compound planetary gear system of claim 4 wherein said locking mechanism additionally comprises a ratcheting mechanism and wherein said ratcheting mechanism releases said LSG when said planetary gear carrier rotates faster than said motor.

11. The compound planetary gear system of claim 1 wherein said locking mechanism is selectable by an operator, wherein when said locking mechanism is not selected said compound planetary gear system provides a slippy 1:1 ratio, and wherein when said locking system is selected said compound planetary gear system provides a reduction ratio.

12. The compound planetary gear system of claim 1 wherein said gears are selected from the group consisting of: spur gears and helical gears.

13. The compound planetary gear system of claim 2 additionally comprising:
   i. a reverse gear unit disposed between MSG and said output means.

14. An aircraft ground wheel comprising a wheel mounted on an undercarriage axle, a motor, and the compound planetary gear system of claim 1, wherein said motor drives said input, and said output drives said ground wheel.

15. The aircraft ground wheel of claim 14 wherein said motor is located inside said nose wheel.

16. The aircraft ground wheel of claim 14 wherein said motor is located inside a fuselage of said aircraft.

17. The aircraft ground wheel of claim 16 wherein drive from said motor to said compound planetary gear system is provided by gearing.

18. The aircraft ground wheel of claim 17 wherein said gearing comprises belts.

19. A system for prerotating an aircraft's landing gear wheel prior to landing wherein the aircraft has at least one landing gear wheel attached to the aircraft by a support, comprising: means for measuring the true ground speed of the aircraft independently from the aircraft's airspeed; means for rotating said wheel at selective rotational speeds while the aircraft is airborne comprising the compound planetary gear system of claim 1 and a motor; means for measuring said rotational speeds of said wheel; and control means for operating said means for rotating said wheel, said control means being responsive to said means for measuring the true ground speed and responsive to said means for measuring said rotational speeds of said wheel, wherein said control means operates said means for rotating to selectively increased and decreased rotational speeds of said wheel to correspond to the true ground speed, and wherein when said locking mechanism is not selected and said compound planetary gear system provides a slippy 1:1 ratio.

20. A compound planetary gear system, comprising:
a. one or more pairs of planetary gears of differing diameters each pair having a common axis and fixedly connected together and rotatable only as a single unit, said common axis attached to:
b. a planetary gear carrier;
c. a pair of coaxial ring gears consisting of a lockable ring gear (LRG) and a moveable ring gear (MRG), wherein said ring gears have differing diameters, independent axes, and are coaxial with said planetary gear carrier; and wherein a larger planetary gear meshes with a smaller ring gear, a smaller planetary gear meshes with a larger ring gear, and the sum of the radii of the smaller planetary gear and the larger ring gear is equal to the sum of the radii of the larger planetary gear and the smaller ring gear, and wherein said ring gears are interlocked by:
d. a magnetic interlock, which causes said ring gears to rotate in synchrony, provided that a differential torque between said ring gears is weaker than said magnetic interlock;
e. a locking mechanism which locks LRG to its axis, wherein when LRG is locked to its axis said differential torque between LRG and MRG is greater than said magnetic interlock and MRG rotates at the rotation rate of said planetary gear carrier multiplied by a gear ratio; and wherein when LRG is not locked to its axis said differential torque between LRG and MRG is less than said magnetic interlock and the two ring gears rotate at the rotation rate of said planetary gear carrier.

21. A compound planetary gear system, comprising:
a. one or more sets of planetary gears of differing diameters each set having a common axis and fixedly connected together and rotatable only as a single unit, said common axis attached to:
b. a planetary gear carrier;
c. a set of coaxial sun gears comprising a lockable sun gear (LSG) and a moveable sun gear (MSG), wherein said sun gears have differing diameters, independent axes, and are coaxial with said planetary gear carrier; and wherein a larger planetary gear meshes with a smaller sun gear, a smaller planetary gear meshes with a larger sun gear, and the sum of the radii of the smaller planetary gear and the larger sun gear is equal to the sum of the radii of the larger planetary gear and the smaller sun gear, and wherein said sun gears are interlocked by:
d. a magnetic interlock, which causes said sun gears to rotate in synchrony, provided that a differential torque between said sun gears is weaker than said magnetic interlock;
e. a locking mechanism which locks LSG to its axis, wherein when LSG is locked to its axis said differential torque between LSG and MSG is greater than said magnetic interlock and MSG rotates at the rotation rate of said planetary gear carrier multiplied by a gear ratio; and wherein when LSG is not locked to its axis said differential torque between LSG and MSG is less than said magnetic interlock and the two sun gears rotate at the rotation rate of said planetary gear carrier.

* * * * *